Patented June 20, 1939

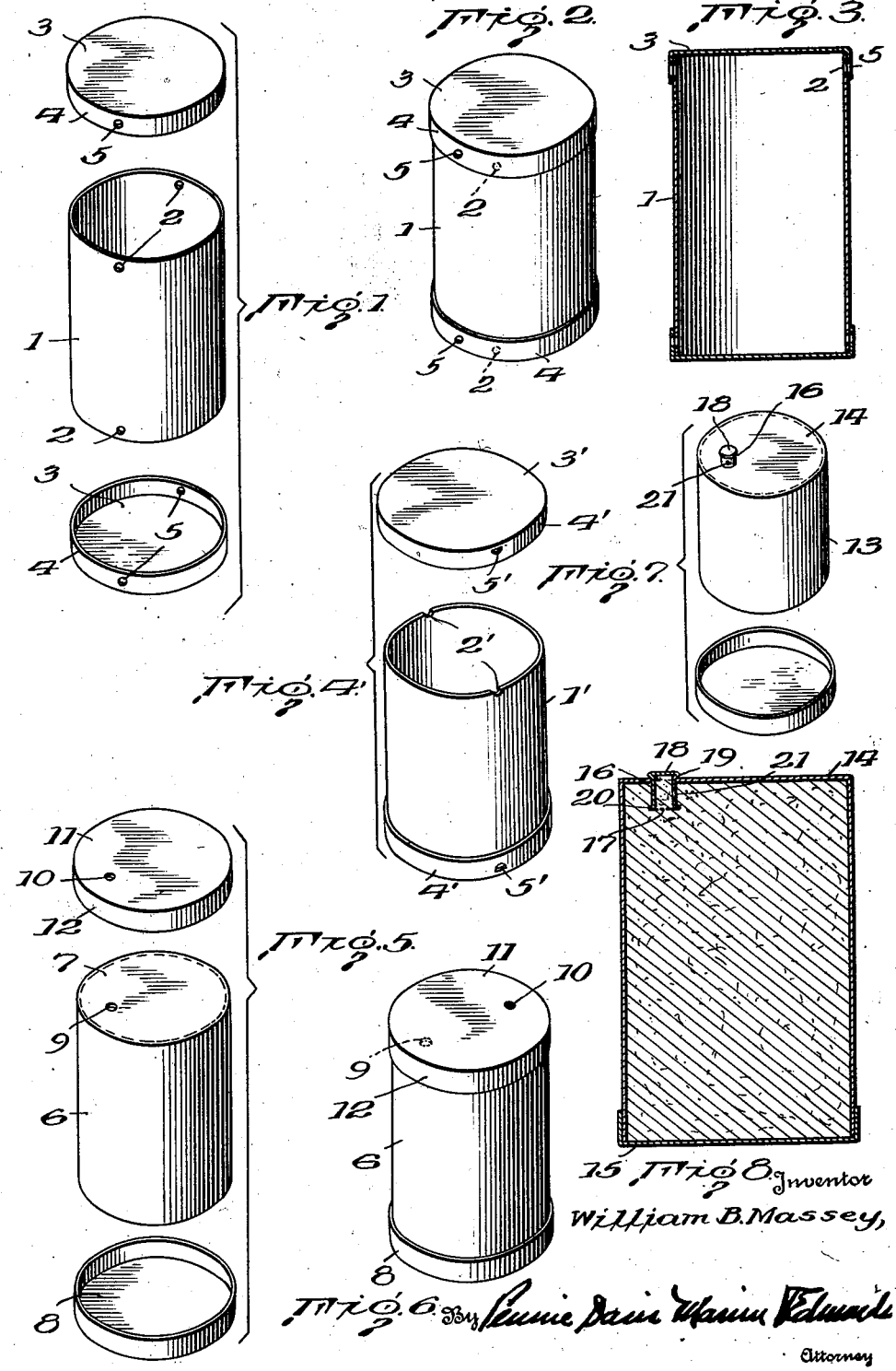

2,162,853

UNITED STATES PATENT OFFICE 2,162,853

CONTAINER

William Broaddus Massey, Southampton, Midlothian District, Va.

Application January 29, 1938, Serial No. 187,747

7 Claims. (Cl. 229—5.5)

This invention relates to a container particularly adapted for receiving ice cream or other plastic material.

Ice cream as now made contains from thirty per cent to fifty per cent or more by volume of air which is beat into or otherwise entrained by the ice cream during its manufacture. The presence of thirty per cent or slightly more air in the ice cream is desirable as it prevents the ice cream from having a "sticky" feel in the mouth, makes it "smoother", and improves the taste. However, the presence of substantial amounts of air in the ice cream presents a serious financial problem for the retailer, as the handling of the ice cream in getting it out of the large cans in which it is delivered to the retailer and the packing of it into the small containers in which it is delivered to the purchaser releases, or presses a large amount of the air out of the ice cream, with the result that a retailer who purchases a five-gallon can of bulk ice cream and sells it to purchasers in one-pint or one-quart lots, may only be able to get from three and one-half to four gallons of ice cream from the original five-gallon can, the other gallon or gallon and a half being the air which was released or pressed out of it in packaging it into the smaller containers.

The present container, to a large extent, will eliminate the packaging loss of the retailer, as it indicates to the person filling it with a plastic, such as ice cream or the like, when all of the air in the closed end of the container has been displaced and that end of the container is full, so that it will not be necessary for the person filling the container thereafter to continue packing the ice cream, with the resultant pressing of entrained air out of it, in order for him to be sure that no voids have been left in the bottom of the container. At the same time, the present container is so constructed as to ensure the customer's obtaining full measure at all times.

In accordance with this invention the end of the container opposite the end being filled—hereinafter called the opposing end—is provided with a vent for the escape of air, and also for the escape of a small amount of the ice cream or other plastic after all the air has been completely displaced from that end.

The container may be constructed in various ways to permit the escape of air and to indicate to the person filling it when the air in the opposing end has been displaced and that end has been completely filled. According to the preferred embodiment of my invention, the container comprises a tubular body of any desired shape, but preferably cylindrical, which is open at each end and is provided with closing caps having a close frictional fit with the tubular body. The tubular body is provided with one or more small openings or vents adjacent at least the opposing end and sufficiently close to the end to lie beneath the closing cap at that end. The closing cap at that end, or both caps if both ends of the tubular body are provided with the vent openings, is provided with openings or vents adapted, when the cap is in one angular position with respect to the tubular body, to register with the corresponding openings or vents in the tubular body, and when the cap is in another angular position with respect to the tubular body to be out of registry therewith and to prevent escape of the contents of the container through the openings.

In accordance with another embodiment of my invention, the opposing end of the container is closed in the usual manner and the end wall is provided with an opening or vent which is adapted to be brought into or out of registry with a similar opening in an overlying cap, depending upon the particular angular position of the cap on that end of the container.

In accordance with a still further embodiment of my invention, the opposing end of the container is closed by the usual end wall and that end wall is provided with a small tube slidable longitudinally therein and having a closed outer end and a small vent opening in its side wall. With such a container, the tube will project from the container while it is being filled and the opening in the side wall will provide a vent for air in the closed end of the container until that end has been completely filled with ice cream or the like, after which a small amount of the ice cream will pass through the opening, indicating that that end of the container is completely filled. Then, or after the container has been completely filled and the closure applied to the other end, the small tube may be pushed into the container for a distance at least sufficient to cause the opening in the side wall to lie within the container.

While containers embodying my present invention may be filled in the usual manner, that is, by a spoon or the like, they are particularly adapted for use with the container filling device which forms the subject matter of my copending application, Serial Number 182,899, filed December 31, 1937, which has means for holding a container in inverted position while a portion of the ice cream is cut from a bulk thereof and conveyed into the container as the device is pushed downwardly into the bulk of ice cream.

The invention will be described further in connection with the attached drawing which illustrate various embodiments thereof. However, it is to be understood that such further disclosure is by way of exemplification and that the invention is not limited to the specific structures shown in the drawings, except as may be set forth in the appended claims.

In the drawing:

Fig. 1 is a perspective view of the preferred form of my invention, with both of the end caps being shown separated from the tubular body in order to show how the vent openings in the container body and caps may be placed in registry;

Fig. 2 is a perspective of the container of Fig. 1, but with both end caps in place on the tubular body and turned slightly so that the vent openings therein are out of registry with the vent openings in the container body;

Fig. 3 is a sectional view through a container of the form shown in Fig. 1, with the end caps in place and the vent openings in the container body and caps in registry;

Fig. 4 is a view similar to Fig. 1 of another embodiment of the invention;

Figs. 5 and 6 are perspective views of a further embodiment of the invention;

Fig. 7 is a perspective view of a still further embodiment of my invention and showing a container having a venting tube extending through the opposing end thereof, the venting tube being shown in its outward position; and Fig. 8 is a sectional view of a filled container embodying the form of the invention shown in Fig. 7, and showing the venting tube pushed to its innermost position.

Referring first to the form of the invention shown in Figs. 1 to 3, the container comprises a tubular body portion 1, which may be of any desired shape but preferably is circular in cross-section. Both ends of the container body 1 are open and the body is provided adjacent each end, at diametrically opposite points, with vent openings 2.

Each end of the tubular body portion is adapted to be closed by caps 3 provided with depending flanges 4 adapted to frictionally engage the side wall of the body 1 and thereby retain the caps in place. The flanges of the caps are provided at diametrically opposite positions with openings 5 and the position of those openings and the openings 2 in the container body are such that when the caps are in position on the container body, and in one angular position with respect to the container body, the openings 2 and 5 will be in registry, as shown in Fig. 3, and when the caps are turned to a different angular position with respect to the body 1 the openings will be out of registry, as shown in Fig. 2. Hereafter, the angular position of the caps with the holes 2 and 5 in registry will be referred to as the "filling position" because the caps are in that angular position when the container is being filled, and the angular position of the caps with the holes 2 and 5 out of registry will be referred to as the "retaining position" because in that position the caps retain the ice cream in the container and prevent it from oozing through the openings in the container body.

The tubular body 1 and the end caps 3 may be of any desired material which is substantially impervious to air and liquids and the particular manner in which the body portion and the end caps are constructed forms no part of the present invention.

The containers may be furnished to retail dealers with both end caps in place on the tubular body portion, and in the filling position, and when it is desired to fill a container with a plastic material such as ice cream, or the like, either one of the end caps may be removed and the material placed in the container. As the material goes into the container, the air in the closed, or opposing end, will pass through the aligned openings 2 and 5 until all of the air in that end of the container has been displaced. A small portion of the plastic material will then pass through the openings and thereby indicate to the person filling the container that all of the air has been displaced from the opposed end and there are no voids left in the plastic material in that end of the container. Due to the fact that the container is being filled with a plastic material, none of it will pass through the aligned openings 2 and 5 until all of the air has been displaced from the opposed end of the container.

The container is shown as being provided with removable, frictionally-engaging caps at both ends so that after the opposing end of the container has been completely filled with the plastic material the end cap at that end may be turned, or moved to a different angular position on the body portion to bring the openings 2 and 5 into a position in which they are not in registry.

Each end of the tubular body portion, and each cap, are provided with the vent openings, so that it will be immaterial which end cap is removed to permit filling of the container.

The body portion and the end caps are provided with openings at each side so that regardless of which side is turned towards the person filling it, he will be able to observe when a small portion of the material with which the container is being filled passes through the aligned openings 2 and 5. As soon as a portion of the material passes through those openings, he may discontinue the pressing of the plastic material into the closed end thereof and thereby eliminate the necessity for further compacting the plastic material, with the resultant forcing of entrained air therefrom.

The form of the invention shown in Fig. 4 is the same as that shown in Figs. 1 to 3, inclusive, except that the openings 2' in the tubular body portion 1' are formed as notches in the opposite ends thereof, and the corresponding openings 5' in the flanges 4' of the end caps 3' are located closer to the base portion thereof in order to align with the openings 2' when the end caps are in one angular position with respect to the body portion.

In the form of the invention shown in Figs. 5 and 6, the container comprises a cup-like container 6 having an open filling end and a closed opposing end 7. The filling end of the container is closed with an end cap 8 as is common in such containers.

The closed end 7 is provided with a non-centrally-positioned vent opening 9, which, when the container is being filled, is adapted to be in registry with an opening 10 in a cap 11 which overlies the end 7 of the receptacle 6 and is maintained in position thereon by a depending flange 12 which frictionally engages the side wall of the container 6.

A container such as is shown in Figs. 5 and 6 is primarily intended for use where the container is being filled while its filling end is directed downwardly, as disclosed in my aforesaid application. After a sufficient amount of a plastic material has been forced into the container to completely fill it, a portion thereof will be forced out through the aligned openings 9 and 10, thereby indicating to the person filling the container that it is completely full. The cap 11 may then be turned to a different angular position to move the opening 10 out of registry with the opening 9, as shown in Fig. 6.

The form of the invention shown in Figs. 7 and 8, like the form shown in Figs. 5 and 6, is adapted to be filled while the open or filling end thereof is directed downwardly and also comprises a cup-like receptacle 13 having a closed end 14 and a filling end adapted to be closed by a removable cap 15. A short tube 16 having an open inner end 17 and a closed outer end 18 is mounted for longitudinal movement in the closed end 14 of the receptacle, and is prevented from being completely removed by outwardly directed flanges 19 and 20 at the outer and inner ends thereof. The side wall of the short tube is provided with a vent opening 21, which when the tube is in its outermost position, as shown in Fig. 7, lies outwardly of the closed end 14 and provides a passage for the escape of air from the closed end of the container when it is being filled. After the closed end of the container has been filled, or after the entire container has been filled, the short tube 16 may be pushed to its innermost position, shown in Fig. 8, to thereafter prevent any of the contents of the container escaping through the opening 21.

The short tube 16 will be of such size as to snugly fit the opening in the closed end 14 through which it extends so that it will be frictionally maintained either in its inner or other positions, depending upon whether the container is being filled, or whether it has been filled and it is desired to prevent leakage of the contents thereof.

The containers of the form of the invention shown in Figs. 4 to 8, inclusive, like the container shown in Figs. 1 to 3, may be formed of any suitable material which is substantially impervious to air, but the containers of all forms of the invention preferably will be formed of a paper-like material of sufficient rigidity and suitably treated to render it substantially waterproof and impervious to air.

From the foregoing it will be seen that the present invention provides a container which will eliminate a large proportion of the packaging loss which now exists in the sealing of ice cream or other plastic material which contains large amounts of entrained air, as the person filling the container will be able to observe when all of the air in the opposed end thereof has been displaced and it will no longer the necessary for him to continue packing the ice cream or the like into the exposed end of the contanier, with resulting compacting and pressing of the entrained air therefrom. Also, as the containers have means at the closed end for permitting escape of air during the filling of the container, there will be no voids in the containers after they have been filled and the purchaser will be assured of getting full measure.

I claim:

1. A container for plastic material and the like having a filling end and an opposing end, a closure readily securable to and readily removable from said filling end, whereby said container may be filled, the closure readily applied and subsequently readily removed for giving access to the contents, and a cap overlying said opposing end, the body of said container being substantially impervious to air and having an opening adjacent the opposing end and located to lie beneath said cap, said cap being movable to filling and retaining positions on the container body and having an opening therein so located that when the cap is in the filling position with respect to the container body, the openings in the container body and the cap will be in registry and when the cap is moved to retaining position said openings will be out of registry and the opposed end closed to retain the plastic material therein.

2. A container for plastic material and the like having a filling end and an opposing end, a closure readily securable to and readily removable from said filling end, whereby said container may be filled, the closure readily applied and subsequently readily removed for giving access to the contents of the container, and a cap for closing said opposing end, the body of said container being substantially impervious to air and having an opening adjacent the opposing end and located to lie beneath said cap, said cap being movable to filling and retaining positions on the container body and having an opening therein so located that when the cap is in the filling position, the openings in the container body and the cap will be in registry during which time the container is filled and when the cap is moved to retaining position said openings will be out of registry and the opposed end closed to retain the plastic material therein.

3. A container for plastic material and the like, said container having a filling end and an opposing end and comprising a tubular body portion substantially impervious to air, and closing end caps having flanges adapted to frictionally engage said tubular body portion and being movable to filling and retaining positions on said body portion, said tubular body portion having an opening adjacent the opposing end located to lie beneath the flange of the closing cap at that end, and the flange of the cap of the opposing end of the container having an opening therein, said opening being so located that when said cap is in the filling position the opening therein and the opening in the body portion are in registry, and when said cap is moved to the retaining position said openings are out of registry and the opposed end closed to retain the plastic material therein.

4. A container as set forth in claim 3 in which the opening in the body portion is a notch in the edge of the opposing end thereof.

5. A container for plastic material and the like, said container being substantially impervious to air and having a filling end and a closed opposing end, said closed opposing end having an opening therein, a member carried by the opposing end and movable to filling and retaining positions with respect to the body of the container, said member having an opening so located that when said member is in the filling position the opening therein is in registry with the opening in said opposing end and when said member is moved to the retaining position said openings are out of registry, and the opposing end closed to retain the plastic material therein, and a closure readily securable to and readily removable from said filling end, whereby said container may be filled, the closure readily applied and subsequently readily removed for giving access to the contents of the container.

6. A container for plastic material and the like, said container being substantially impervious to air and having a filling end and a closed opposing end, a cap overlying said closed opposing end and having flanges frictionally engaging the body of the container, said cap being movable to filling and retaining positions with respect to the body portion of said container and having an opening therein, said closed opposing end also having an opening therein, the openings in said closed opposing end and in the overlying cap being so positioned with respect to one another that when the cap is in the filling position on the body of the container said openings are in registry and when said cap is moved to retaining position said openings are out of registry, and the opposed end closed to retain the plastic material therein, and a closure readily securable to and readily removable from said filling end, whereby said container may be filled, the closure readily applied and subsequently readily removed for giving access to the contents of the container.

7. A container for plastic material and the like having a tubular body portion substantially impervious to air, caps for each end of said tubular body portion having flanges adapted to frictionally engage said body portion, said body portion having an opening adjacent each end, the opening at one end being located to be beneath the flange of the cap for that end of the body portion and the opening at the other end of the body portion being located to be beneath the flange of the other cap, the flange of each cap having an opening therein, the openings in the flanges of the end caps being so located as to be brought into or out of registry with the respective openings in said body portion, depending upon the angular positions of the end caps on the body portion, either of said caps being removable to provide access to the interior of the container for filling purposes, the other of said caps then forming the closure for the other end of the body portion and being movable to a filling position in which the opening in the flange thereof and the opening at that end of the body portion are in registry, and to a retaining position in which the opening in the flange thereof and the opening in that end of the body portion are out of registry, and that end of the body portion is closed to retain plastic material therein.

WILLIAM BROADDUS MASSEY.